Sept. 22, 1970 LE ROY V. ALWIN 3,529,366

DEVICE FOR CORRELATING THREE INPUT VARIABLES

Filed Sept. 5, 1967 2 Sheets-Sheet 1

INVENTOR.
LEROY V. ALWIN
BY
Dugger, Peterson, Johnson & Westman
Attorneys

INVENTOR.
LEROY V. ALWIN
BY
Dugger, Peterson, Johnson & Westman
Attorneys 3,529,366

DEVICE FOR CORRELATING THREE INPUT VARIABLES

Le Roy V. Alwin, Box 126, Mound, Minn. 55364

Filed Sept. 5, 1967, Ser. No. 665,468
Int. Cl. G09b *1/22*
U.S. Cl. 35—74 7 Claims

ABSTRACT OF THE DISCLOSURE

A slidable strip is rectilinearly positioned in accordance with barometric pressure. A relatively small disc is rotatively positioned in accordance with the wind direction, and a larger disc is rotatively positioned in accordance with the existing cloud type. The smaller disc is mounted on the larger disc for rotation about an axis offset from the axis about which the larger disc rotates. A spiral curve on the smaller disc is viewed through an elongated slot in the strip which provides a correlated output indicative of the weather to be expected.

BACKGROUND OF THE INVENTION

Field of the invention

This invention relates generally to devices for correlating data and pertains more particularly to a device for correlating three input variables so as to derive an output reading representative of all three inputs.

Description of the prior art

While my invention may be adapted to processing data in other arts, it will find especial utility in the forecasting of weather. In this regard, in order to forecast weather accurately, selected data representative of cloud conditions, the direction of the wind, and also barometric pressure are necessary. In the past, the devices have lacked the capability of combining three variables, each being representative of data that determines the resulting weather. It is an object of the present invention to provide a simple device that can be easily manipulated with the data normally available so that the user can accurately predict what the weather will be.

SUMMARY OF THE INVENTION

Briefly, the invention involves the employment of three members, each being movable relative to the other and each having indicia representative of data that is to be used in providing a combined output reading that reflects the data that has been selected from each member. More specifically, two of the members comprise rotatable disc for rotation about a pivotal axis offset from the first one pivotal axis and the second disc mounted on the first disc for rotation about a pivot axis offset from the first axis. The third member constitutes a slide that can be positioned with respect to the two discs so that the output information can be readily read after the slide has been properly positioned.

DESCRIPTION OF THE PREFERRED EMBODIMENT

Figures 1, 2:
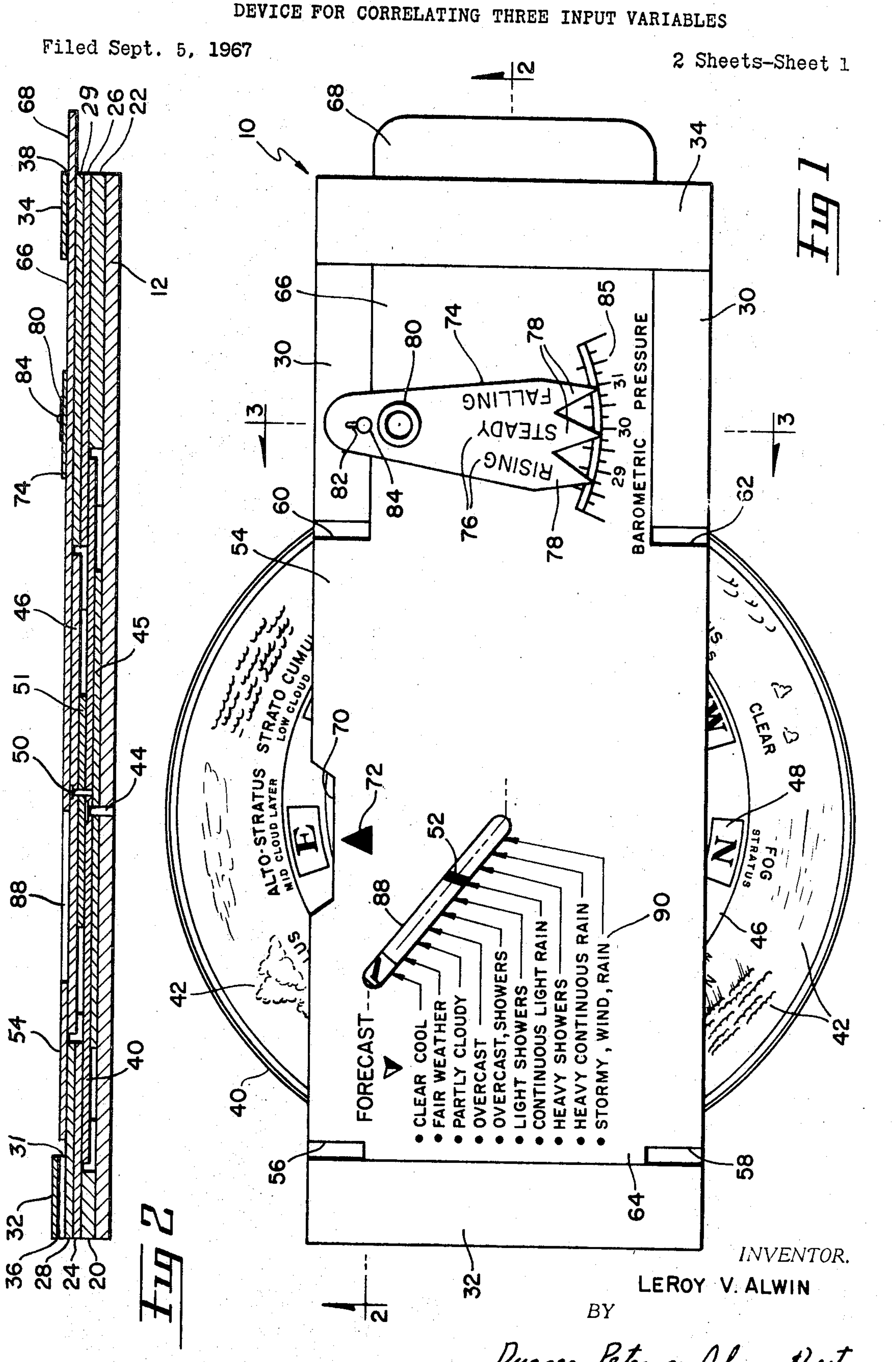
FIG. 1 is a plan view of a device exemplifying my invention, the data appearing thereon being concerned with the forecasting of weather.
FIG. 2 is a longitudinal sectional view taken in the direction of line 2—2 of FIG. 1.
Figure 3:
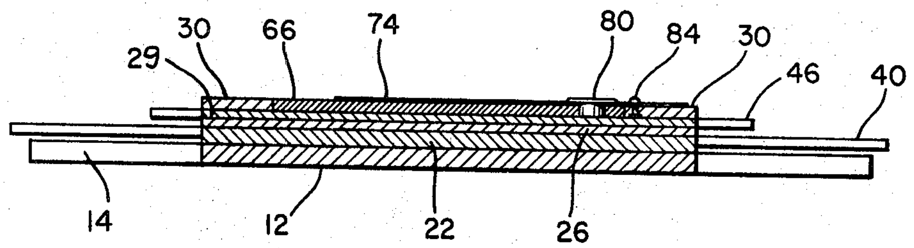
FIG. 3 is a transverse sectional view taken in the direction of line 3—3 of FIG. 1.

My device as illustrated in FIG. 1 includes a base unit designated generally by the reference numeral 10. From FIGS. 2 and 3, it will be perceived that the unit 10 comprises a bottom panel 12 which has the same peripheral outline as the device as it appears in FIG. 1. More specifically, the bottom panel 12 includes a circular intermediate portion 14 (visible in FIG. 3) that underlies a pair of discs hereinafter referred to. At each end of the device and secured to the bottom panel 12 are first level spacer strips or sections 20, 22. Immediately above the first level spacer strips are second level spacer strips or sections 24, 26. Third level spacer strips or sections 28, 29 are integral with and overlie the spacer strips 24 and 26, respectively. Longitudinally directed, spaced guide elements 30 (FIGS. 1 and 3) are attached to marginal portions of the strip or section 29. Smaller guide elements 31 similarly are attached to the strip or section 28. A pair of bridging strips 32, 34 are secured to the elements 31 and 30, respectively, thereby forming openings at 36, 38, the purpose of which will presently be explained.

Figure 4:
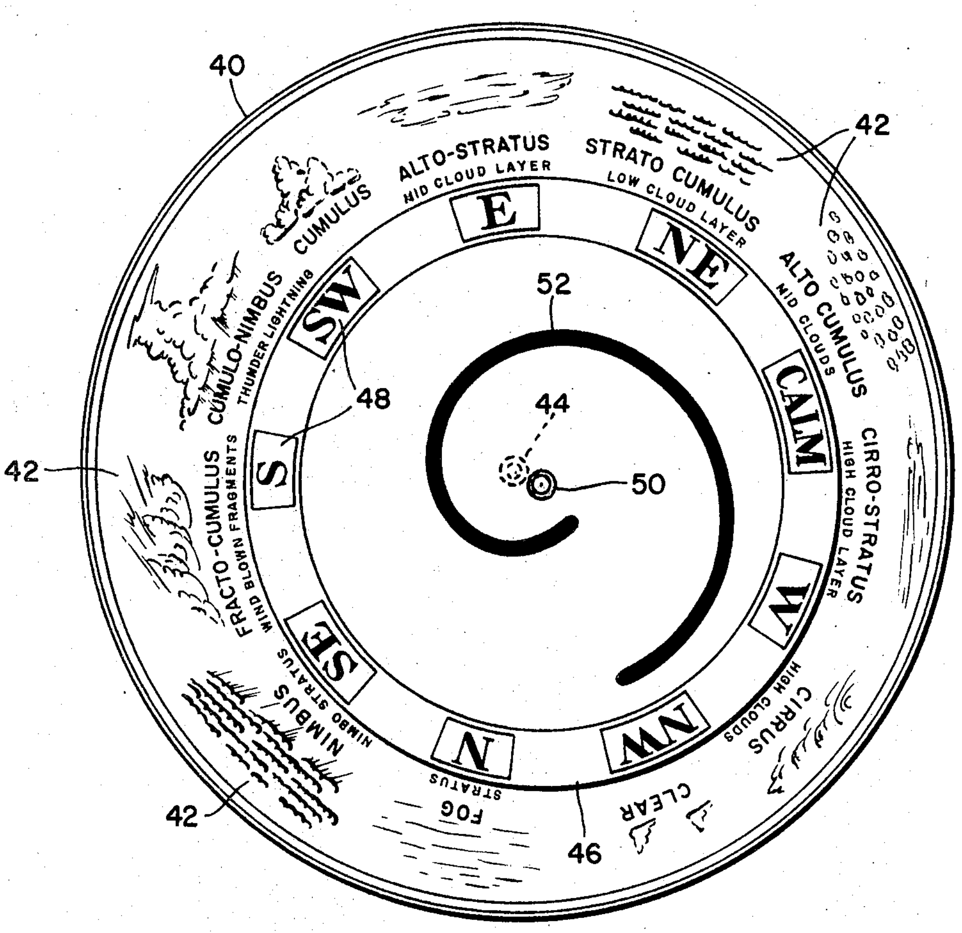
FIG. 4 is a plan view of the two discs assembled with respect to each other for the purpose of depicting all of the data appearing on these two discs, the view also showing the offset relationship of the axis of rotation of the smaller disc with respect to the larger disc.

At this time, attention is directed to a relatively large disc 40 having angularly disposed indicia 42 representative of certain data, the data in this instance appearing as cloud-type information. As can be readily discerned from FIG. 4, this data is innerjacent the circumference of the disc 40. The disc 40 is rotatably mounted on the bottom panel 12, actually at the center of the circular portion 14, a tubular rivet 44 (FIG. 2) forming the pivotal axis. As is also visible in FIG. 2, a circular spacer 45 of smaller diameter maintains the disc 40 in a slightly raised relation with the portion 14 of the panel 12, thereby facilitating the rotation of said disc 40.

A smaller disc 46 has indicia 48 about its circumference, this indicia being representative of wind data. A tubular rivet 50 supports the disc 46 for rotation on the disc 40. Here again, a circular spacer 51 makes it easier to rotate its overlying disc 46. However, it is important to note that the rivets 44 and 48 are offset somewhat from each other. Stated somewhat differently, the rotation of the disc 40 is about one axis and the rotation of the disc 46 is about an axis that is spaced and parallel with respect to the axis of rotation of the disc 40. Although the reason therefor will not be readily apparent at this stage of the description, nonetheless a spiral curve or line 52 appears on the face of the disc 46.

A slide strip 54 can be moved in a reciprocal path with respect to the discs 40 and 46. As can be observed from FIG. 1, the strip is notched at 56, 58, 60 and 62, thereby forming tracking or guide portions 64 and 66. It will be recalled that the bridging strips 32, 34 form openings 36, 38, and at this time, it will be understood that these openings receive the guide portions 64 and 66 of the slide strip 54 so as to constrain the strip 54 for rectilinear movement to the left or the right. In other words, the elements 31 constrain the guide portion 64 for rectilinear movement at one end of the device and the elements 30 the guide portion 66 at the other end. The movement is easily achieved via a projecting end 68 on the guide portion 66, this projecting end 68 being easily grasped by the user so that he can shift the strip 54 to the requisite extent. The slide strip 54 is formed with a notch at 70 and it will be perceived that an arrow 72 has been located adjacent the notch, this arrow facilitating the angular orientation of the discs 40 and 46.

Carried on the slide strip 54 is a pointer member 74 having indicia 76 thereon in the form of legends indicating a "rising," "steady" and "falling" barometric condition. Three points 78 are formed at one end of the pointer 74, one point 78 being immediately adjacent each of the above-alluded-to legends. The pointer 74 is pivotally attached to the slide strip 54 by means of a tubular rivet 80. The pointer 74 is sufficiently long so that an end section thereof extends beyond the rivet 80; in this end portion is a slot 82 into which a stationary pin 84 projects, the pin 84 being anchored to one of the elements 30. A slot 88 forms an inclined read-out window through which a small segment of the curve 52 may be seen. At spaced intervals along the slot 88 are indicia 90 representative of the output information that is a reflection or correlation of the selected indicia on all three members 40, 46 and 54.

In using the device exemplified in the drawings, the user would first determine the barometric pressure. Assuming that the barometic pressure is steady at 29.85, the user grasps the projecting end 68 and the manual movement of the strip 54 will automatically cause the pointer 74 to pivot about the axis formed by the tubular rivet 80. This occurs owing to the presence of the slot 82 and the pin 84, the pin 84 preventing longitudinal movement of the pointer 74 in unison with the movement of the strip 54. The user shifts the strip 54 until the central point 78 is brought into alignment with the appropriate part of the scale or indicia 85. This causes the arrow 72 to be moved into a reference position.

Next, the smaller disc 46 is rotated about the axis provided by the tubular rivet 50 so that indicia representative of the prevailing wind direction is brought into registry with the arrow 72. Assuming that the cloud type is of the alto-stratus type, the larger disc 40 is then rotated so that this particular indicia is angularly oriented with the arrow 72, and also with the selected indicia on the disc 46. The disc 46, as should be readily understood, is prevented from rotating while the disc 40 is rotated. Although held, the disc 46 shifts somewhat owing to the offset or spaced relationship of its axis of rotation with respect to the axis of rotation of the disc 40.

Consequently, while the strip 54 is initially shifted in accordance with one data input, the rotation of the disc 46 introduces another variable input which is correlated with the input derived from the strip 54. When the disc 40 is rotated and positioned angularly with respect to the disc 46 (and also the arrows 72 on the strip 54), a third variable input is introduced. The segment of the curve 52 visible through the slot 88 will shift while the discs 46 and 40 are rotated. However, after the several adjustments have been completed, the position of the exposed segment of the curve 52 will be brought in registry with one of the weather conditions included in the indicia 90. As shown, the several variable inputs have resulted in an expected weather forecast of continuous light rain. Hence, barometric pressure, wind direction, and cloud conditions have all been correlated so as to give an easily read output that is a correlation of all of the inputs.

I claim:

1. A device for correlating three informational inputs comprising a base unit, a first disc member mounted on said base unit for rotation about a first axis, said first member having circumerentially arranged indicia thereon representing one set of data whereby said first member can be moved to a position to provide an informational input indicative of certain data selected from said first set, a second disc member mounted on said first member for rotation about a second axis offset with respect to said first axis whereby rotation of said first member about said first axis angularly shifts said second axis to a different location with respect to said base unit, said second disc member being of smaller diameter than said first disc member and having circumferentially arranged indicia thereon representing a different set of data whereby said second member can be moved to a position to provide a second informational input indicative of certain data selected from said second set, said second axis being located near said first axis so that the circumferential indicia on said second disc member is innerjacent the circumferential data on said first disc member, a third member mounted for relative movement with respect to both said first and second disc members, said third member constituting a strip slidably disposed on said base unit for rectilinear movement relative to both said first and second disc members and having indicia thereon representing still another set of data whereby said third member can be moved to a position indicative of certain data selected from said third set, and means for providing a correlated informational output derived from the relative positions of said three members.

2. A device for correlating three informational inputs comprising a base unit, a strip slidably disposed on said base unit for relative movement with respect to said base unit, said strip having indicia thereon representing one set of data, a pointer pivotally attached intermediate its ends to said strip member so that one end is selectively movable into alignment with the indicia on said strip, means on said base unit for restraining movement of the other end of said pointer so that slidable movement of said strip produces pivotal movement of said pointer, whereby said strip can be moved relative to said pointer to a position to provide an informational input indicative of certain data selected from said one set, a relatively large first disc rotatably supported on said base unit about a first axis, said first disc having circumferentially arranged indicia thereon representing a different set of data whereby said first disc can be rotated to a position to provide a second informational input indicative of certain data selected from said second set, a smaller second disc rotatably supported on said first disc about a second axis offset with respect to said first axis, said second disc having circumferentially arranged indicia thereon representing still another set of data whereby said second disc can be moved to a position indicative of certain data selected from said third set, and means for providing a correlated informational output derived from the relative positions of said three members.

3. A device as defined in claim 2 in which the indicia on said strip is arcuately arranged.

4. A device as defined in claim 2 in which said means for providing a correlated output includes a curved line on said second disc varying in distance from the axis of rotation of said second disc and an elongated window in said strip disposed at an angle so that the particular segment of said line visible through said window denotes said correlated output.

5. A device as defined in claim 4 including indicia on said strip adjacent said window representing a set of expected conditions, the alignment of the visible segment of said line with certain of said last-mentioned indicia indicating the specific condition to be expected, said specific condition being in accordance with said correlated output.

6. A device as defined in claim 5 in which the first-mentioned indicia on said strip represents barometric pressure data, the indicia on said first disc represents cloud data, the indicia on said second disc represents wind direction data, and said last-mentioned indicia on said strip represents possible weather conditions, the specific condition with which said line segment becomes aligned denoting the weather to be expected.

7. A device as defined in claim 6 in which said pointer has three arcuately spaced points at its said one end, each of said points being indicative of a rising, steady or falling barometric pressure.

References Cited

UNITED STATES PATENTS

| | | | |
|---|---|---|---|
| 1,462,850 | 7/1923 | Clark | 35—74 X |
| 2,222,272 | 11/1940 | Wesner | 35—74 X |
| 2,385,732 | 9/1945 | Redding | 35—74 X |
| 2,526,114 | 10/1950 | Blewett | 40—70 |
| 2,934,264 | 4/1960 | Miller | 235—88 |
| 3,044,698 | 7/1962 | Maluf | 235—88 X |
| 3,088,226 | 5/1963 | Watterson et al. | 35—74 X |
| 3,394,472 | 7/1968 | Stein | 35—74 |
| 2,021,089 | 11/1935 | Philippbar | 40—70 |
| 2,531,932 | 11/1950 | Brown | 235—64.7 X |

EUGENE R. CAPOZIO, Primary Examiner

H. S. SKOGQUIST, Assistant Examiner

U.S. Cl. X.R.

40—70; 235—88

PO-1050
(5/69)

UNITED STATES PATENT OFFICE
CERTIFICATE OF CORRECTION

Patent No. 3,529,366 Dated 9/22/70

Inventor(s) Le Roy V. Alwin

It is certified that error appears in the above-identified patent and that said Letters Patent are hereby corrected as shown below:

Column 1, line 52, change "disc" to --discs, the first disc being supported--; same line, cancel "a pivotal axis offset from the first"; line 54, change "pivot" to --pivotal--.

SIGNED AND SEALED
NOV 24 1970

(SEAL)
Attest:

Edward M. Fletcher, Jr.
Attesting Officer

WILLIAM E. SCHUYLER, JR.
Commissioner of Patents